United States Patent [19]
Peyret

[11] Patent Number: 5,850,447
[45] Date of Patent: Dec. 15, 1998

[54] SECURED SYSTEM OF REMOTE PARTICIPATION IN INTERACTIVE GAMES WITH VERIFICATION OF THE CHRONOLOGY OF EVENTS

[75] Inventor: Patrice Peyret, Fuveau, France

[73] Assignee: Gemplus Card International, Gemenos Cedex, France

[21] Appl. No.: 280,012

[22] Filed: Jul. 25, 1994

[30] Foreign Application Priority Data

Aug. 5, 1993 [FR] France .................................. 93 09679

[51] Int. Cl.[6] ...................................... A63F 9/24
[52] U.S. Cl. ................... 380/25; 463/29; 463/40
[58] Field of Search ...................... 380/23–25; 273/432, 273/439; 463/29, 40

[56] References Cited

U.S. PATENT DOCUMENTS 4,592,546  6/1986  Fascenda et al. ....................... 273/439
5,073,931  12/1991  Audebert et al. ....................... 380/23

FOREIGN PATENT DOCUMENTS 2658375     2/1990   France .
A-O 399 897 11/1990  France .
2647619    10/1991   France .
WO-A-90/
 04439     3/1990   WIPO .
WO-A-92/
 10806     6/1992   WIPO .

Primary Examiner—Gilberto Barrón, Jr.
Attorney, Agent, or Firm—Nilles & Nilles, S.C.

[57] ABSTRACT

A secured system of remote participation in interactive games with verification of the chronology of events relies on the counting, by a secured microprocessor (for example a microcircuit card), of consecutive periods of time of which the first one (Tr12) is initialized by a cryptographically secured message sent by the transmitter and the last one (Tr25) is ended by a connection of the games machine to the central computer of the transmitter for the forwarding thereto of the answer.

14 Claims, 3 Drawing Sheets

SECURED SYSTEM OF REMOTE PARTICIPATION IN INTERACTIVE GAMES WITH VERIFICATION OF THE CHRONOLOGY OF EVENTS

BACKGROUND OF THE INVENTION

1. Field of the Invention

The invention relates to a tamper-proof or secured system of remote or long-distance participation in interactive games with verification of the chronology of events.

With the advent of so-called interactive television systems, it is desirable to enable televiewers to take part in games where, for example, they are asked, during a broadcast, to give answers to questions broadcast from a station.

During such games, a maximum answering time has to set in order to prevent the televiewer from making his answer after the solution to the game has been given from the station or after he has looked up the answer in an encyclopedia or any other reference data base.

It is also desirable that the televiewer's answer should not be forwarded, in real time, to the supplier of the service (the cable operator, the broadcasting studio, etc.) so as to avoid "saturating" this supplier with thousands of simultaneous answers. To do this, a store-and-forward system is indispensable. In this system, the televiewer's answer is stored at his home in a secured way in a mass consumer type of apparatus (such as a cable decoder, dedicated games machine, etc.) and then forwarded later at appropriately staggered times, by radio-telephone, cable or any other suitable means of telecommunications.

2. Description of the Prior Art

There are examples of such systems developed in the United States, for example by the firm Interactive Game Networks, where televiewers have a small games machine provided with a radio interface, a keyboard, a screen, a modem and a security module.

Reference may be made to FIG. 1, which is a diagram of the chronology of events, in order to understand the operation of such a system.

The questions are broadcast at an instant T1 from a transmitter/central computer hereinafter called a "central computer". These questions are broadcast by radio to these machines. For example, at the beginning of a football match, the televiewers are asked to guess the number of goals scored at half-time. The question is displayed on the screen of the machine. The answer is entered by each televiewer participating in the game at the instant T2, by means of the keyboard of his machine, and is recorded in a secured chip (of the type used in smart cards) mounted on the same machine. A few minutes after the question has been asked, at the instant T3, a new broadcast signal locks the entire population of machines so that they no longer accept any answers. The answer to the question is broadcast at the instant T4 (in fact, T4 corresponds to half-time in this example). The answer recorded is forwarded later, at the instant T5, to the games central computer by modem through the switched telephone network and serves as proof of participation. If the televiewer has given the right answer, he or she may be in for some winnings.

In certain proposals of implementation such as the one described in the U.S. Pat. No. 4,592,546, a sufficiently precise clock circuit placed within the games machine is used to date each event. When the players' answers are forwarded to the games central computer, the times recorded by the machine are given to the central computer and compared by it with the reference time that it has kept.

In other proposals of implementation, each mass-consumer type of games machine is provided with an electronic real-time clock circuit synchronized at regular intervals (for example by radio link) with a reference clock signal sent out by the games central computer.

The time T1 at which the question is broadcast and the time T2 at which the answer is given are recorded in the machine (for example in a secured way inside a chip for smart cards).

When the connection is made to the games central computer, the answer as well as the times recorded are forwarded as proof of participation. The central computer ascertains that the information on time T1 forwarded is within an acceptable tolerance bracket and that T2 is prior to T3 which is the deadline allowed for the answers.

DRAWBACKS OF THE CURRENT SYSTEMS

In the above-mentioned systems, or in other similar forms of implementation, an ill-intentioned user may very well make a recording, in an appropriate machine, of the control signals sent to his games machine (such as questions, locking commands, clock synchronization signals, etc.).

Then, at a slightly deferred point in time, once the answer to the question has been broadcast by the station is known to him by specific research or by any other means, this ill-intentioned individual can replay the control signals in his machine and thus simulate a real-time answer. This is made possible because the fraudulent individual has no witnesses in the privacy of his home and because there is always a reasonably sufficient amount of time that elapses between the end of play and the expected forwarding of the answers to the central computer. Finally, it is not possible, economically, for the games machine to have a means of knowing whether the signals that it receives from the outside world, which are supposed to be secured, are truly generated in real time or whether they are being given with a slight delay after having been recorded without any modification.

In a patent filed in France under No. 89 06848 and published under No. 2 647 619 and the addition number 90 01512 published No. 2 658 375, a system is described enabling the prevention of this fraud by deferred playing, wherein:

the central computer counts the absolute time that elapses between the instant referenced T3 when the answer is broadcast (or the deadline allowed for giving the answer) and the instant T5 at which the answers by the televiewers are forwarded to the central computer;

the televiewer's answer activates, at the instant T2, the start of a local time counting operation in the machine;

at the instant T5 of when the information is forwarded to the central computer, this central computer ascertains that the time T5-T2 measured by the machine in the player's home is truly greater than the absolute time T5-T3 that it has itself computed.

The timing diagram shown in FIG. 2 illustrates these sequences.

The approach proposed in this patent is unfortunately not infallible because the user, by accelerating the local-time counter, can make it seem as if, between the answer and the connection to the central computer, there has elapsed a period of time T5-T2 that is lengthier than the time that has actually elapsed. This is possible by a simple temporary modification of the oscillation frequency of the electronic clock circuit located in the games machine.

Indeed, the counter in the machine is accessible to the user, unless it is physically secured, i.e. embedded in a resin. Whether this circuit is supplied by an RC network oscillator, a ceramic resonator oscillator or a quartz oscillator, its natural frequency can be deflected by a slight mismatching of the oscillating element. It is thus possible, without any difficulty, to accelerate or slow down the oscillator by a small percentage.

By accelerating the oscillator which supplies the clock circuit of the games machines, a fraudulent individual can wait beyond the deadline T3 (for example to wait for the answer to be broadcast live) and then accelerate the oscillator of the machine to catch up with the delay. Thus, when his machine is interrogated by the central computer at the instant T5, the apparent time T5-T2 given to this central computer will be even greater than in reality.

There are known ways of fitting out certain microprocessors for microcircuit cards with clock frequency detectors to detect the anomalies in this clock frequency. This type of detector is activated when the clock frequency that supplies the component is excessively low, for example in order to prevent a fraudulent individual from attempting a "step by step" approach to the program carried out by the processor. Typically, a low frequency detector such as this is activated below about 500 KHz when the nominal frequency of the component is between 1 MHz and 5 MHz. The substantial lack of precision of this type of detector and the fact that it exists only to detect excessively low frequencies mean that it cannot be used to overcome the above-mentioned type of fraud.

The invention is aimed at overcoming the drawbacks of presently used systems.

Indeed, the system of which the invention is an object can be used for the secure verification of the fact that the televiewer has truly answered the questions asked between the instant when these questions are asked and a deadline decided by the transmitter of the game.

The proposed system is based on the counting, by a secured processor (for example a microcircuit card processor), of consecutive time intervals, the first one of which is initialized by a cryptographically secure message sent by the transmitter and the last one of which is ended by a connection of the games machine to the central computer of the transmitter in order to forward the proof of the answer thereto.

SUMMARY OF THE INVENTION

An object of the present invention, more particularly, is a secured system of remote participation in interactive games comprising a transmission central computer transmitting cryptographic messages received by television receivers during the progress of the television program, the televiewers having available a games machine capable of reading the televised messages and sending back an answer to the questions asked in these messages, wherein:

the games machine has means for the counting of a duration or period of time Tr12 defined by the instant t1 of reception of a message and the instant t2 of the televiewer's answer and a period of time Tr25 defined by the instant t2 of the televiewer's answer and the instant t5 of the forwarding of the answer to the central computer;

the central computer has means for the counting of a period of time ta35 defined by the answering deadline t3 and the answer forwarding instant t5 and a period of time ta15 defined by the instant t1 of transmission of the message and the answer forwarding instant t5, and it further comprises computation means enabling the checking of the following relationships:
Tr25>Ta35
and Tr12+Tr25=Ta15±tolerance values,
and being capable of rejecting the answers when the relationships are not verified.

The counting means of the games machine are formed by a secured microprocessor controlled by a clock implementing a clock pulse counting program.

The invention also relates to a machine for participation in broadcast programs and for certification of participation in conjunction with a remote central computer comprising:

means for the reception of digital information elements coming from the central computer, interface means for the introduction, by a participant, of the data elements representing his participation, means to set up a connection to the central computer, at least one secured electronic component comprising a microprocessor and its storage means, at least one clock signal generation circuit wherein:

when the machine receives, at an instant T1, a digital message having a predetermined form, it sends it to the secured microprocessor, after verification, the secured microprocessor records this message in its memory and starts counting time units proportional to the period of the clock signal that is given to it by the clock signal generation circuit, when, at an instant T2, the machine receives, from a televiewer possessing this machine, data elements relating to his participation, it transmits these data elements to the secured microprocessor which records them in a requisite form in its memory and also records the time counting value at this instant;

the secured microprocessor continues the counting until the machine has been put into contact, by the means for setting up a connection, with the central computer at an instant T5;

as soon as the connection is set up, the microprocessor sends the stored data elements on participation and the counting values Tr12 and Tr25 so that the central computer can verify that these values are compatible with its own counting values and can reject the answer if this is not the case.

The invention also relates to a central computer device designed to manage the participation of an audience of televiewers in broadcast scenarios, the televiewers having, for this purpose, an electronic participation machine comprising:

time counting means, means to broadcast digital messages for individual electronic participation machines, means to set up a connection with the individual electronic participation machines, storage processing means wherein chiefly:

when a new broadcast scenario is initialized, the device, at the instant T1, uses an appropriate transmission channel to broadcast a digital message to individual machines of the televiewers and initializes and activates the time-counting means, at the predetermined instant T3, chosen as being the instant when the audience should no longer participate in the scenario, it memorizes the time-counting value and continues this counting, at the instant T5, chosen as being the instant when the machines get connected to the central computer, it memorizes the time-counting values obtained by the machines and checks the following relationships:

Tr25>Ta35 and Tr12+Tr12=Ta15±tolerance values wherein:

Tr25 is the period of time of counting by the machine between T2 and T5,

Tr12 is the period of time of counting by the machine between T1 and T2,

Ta35 is the period of time of counting by the central computer between T3 and T5, Ta15 is the period of time of counting by the central computer between T1 and T5.

Each game machine is provided with a secured microprocessor for microcircuit cards. In another embodiment, the microcircuit may be in a card having a bank card format, plugged into the machine, the machine then acting as a card reader of the kind that is commercially available.

Alternatively, the secured circuit may be contained in a portable object other than a card such as, for example, a plastic key or any other object deemed to be appropriate.

The secured circuit may also, as stated here above, be installed directly in the main circuitry of the machine, if it is considered that it is not necessary for it to be detachable.

The term "secured microprocessor" is understood to mean any protected microprocessor such as those used in smart card applications, for example in the bank cards currently being distributed by banks.

BRIEF DESCRIPTION OF THE DRAWINGS

Other advantages of the invention shall appear from the following description, made by way of a non-restrictive illustration with reference to the appended drawings, of which.

MORE DETAILED DESCRIPTION

Figure 4:
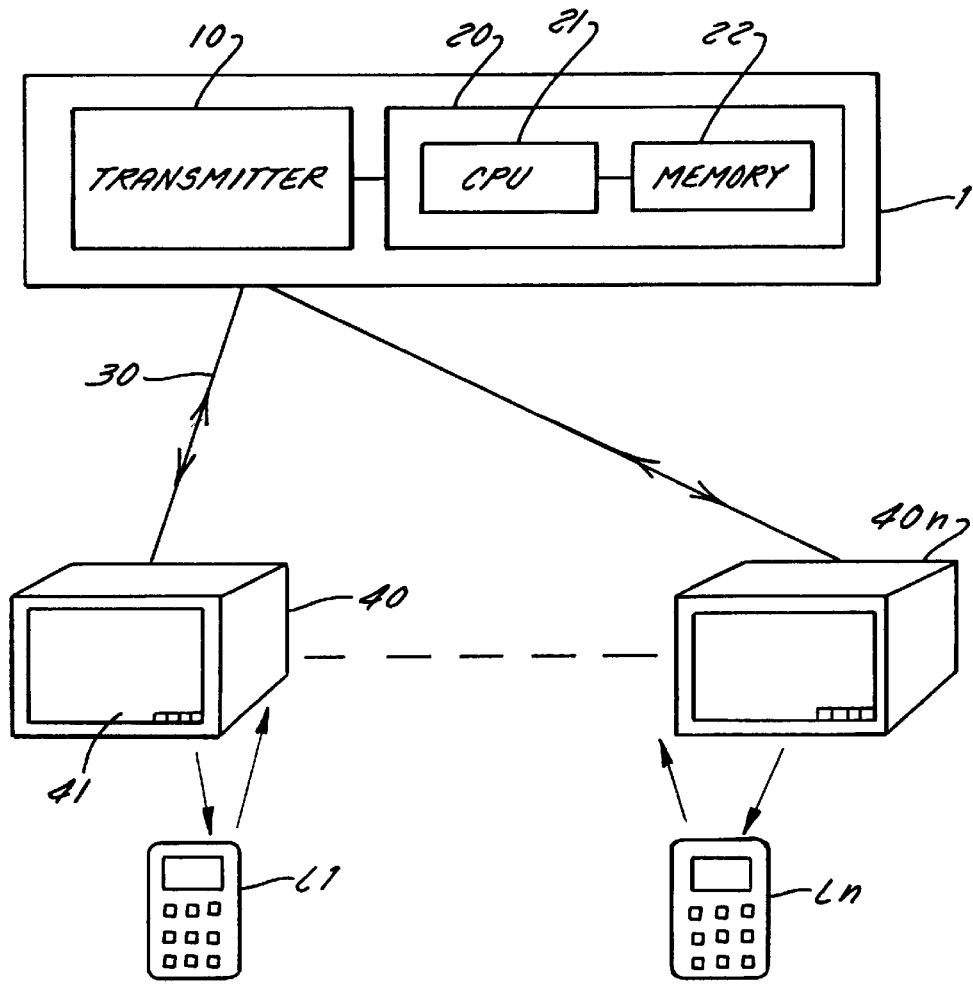
FIG. 4 is a drawing showing the principle of the games system.

The diagram of FIG. 4 illustrates a secured system of participation in games enabling the instrumentation of the sequences described hereinafter and shown in Table A appended to the description. The system has a transmitter/central computer including a set 10 formed by a television programme transmitter and a central computer unit 20 linked to the transmitter 10 and capable of sending games messages in encrypted form such as those described, for example, in the above-mentioned patent applications.

The transmitter/central computer is connected by transmission means 30 to receivers placed in the users' homes. Users wishing to participate in the games that are broadcast have machines L1 ... Ln available, capable of reading the encoded messages on the receiver and of getting connected to the central computer in a standard way.

At the instant T1 when the message is sent out, namely when the televiewer is asked the question, the transmission center and games central computer 1 sends the games machine L1, Ln a cryptographic message, signed for example with a known card operating secret key.

The dispatch of this message can be done by a transmission channel 30 which may be a dedicated data channel located:

either in the same channel as the televised signal (for example in the return frame)

or in a separate channel of the same medium (for example a dedicated HF channel on the cable which furthermore conveys the television channels)

or in a channel on a different medium (for example an FM radio channel as in the Interactive Game Networks in the United States).

The data channel does not need to be one-directional from the transmitter of the signal and the provider of services to the televiewers.

The games machine L1, when it receives this signal, which appears in the form of a code on the screen 11 of the television receiver 10, sends it to the secured component CS placed in the machine or on a detachable medium as described hereinafter.

The machine is provided with a known electronics circuitry of the type described in the above-mentioned patents for example, enabling it to receive messages that appear on the television screen and send answer messages to the central computer.

Figure 5:
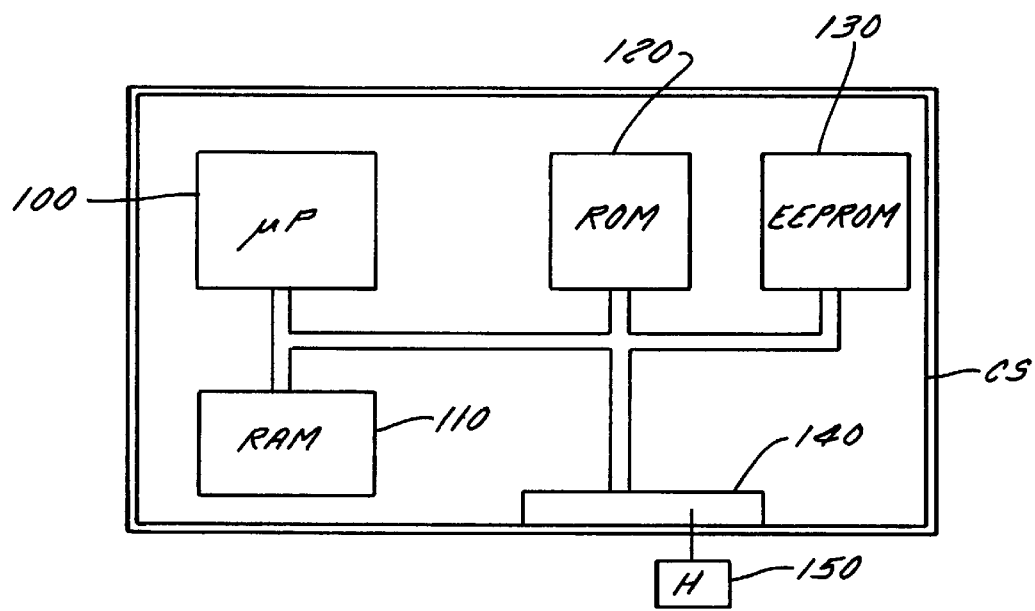
FIG. 5 is a detailed diagram of a secured component according to the invention.

The secured component CS is shown in FIG. 5 and has a microprocessor 100 provided with volatile and non-volatile memories: a RAM working memory 110, a ROM program memory 120 and an EEPROM data memory 130. It receives clock pulses from a clock signal generator 150 of the machine. It furthermore has means of connection to the machine symbolized by the set 140. When a message appears on the screen, the microprocessor 100 receives this message, verifies its authenticity in a usual way and activates the implementation of a time-counting sub-program on the basis of the clock pulses, this sub-program being contained in its ROM memory 120.

In fact, the secured microprocessor counts time units proportional to the clock frequency 150 with which it is supplied and not an absolute time since it does not contain any temporal reference other than this clock signal. Furthermore, the secured microprocessor 100 makes a recording, in its non-volatile memory EEPROM 130, of the cryptographic message (or a shadow of this message) that has activated the counting operation.

Reference may be made to the Table A appended to the description for a clearer understanding of what follows:

At the instant T2, when the televiewer answers the question by means of his machine L1, this answer is transmitted to the secured microprocessor 100 which records it in its known volatile memory 130 and also records the time-counting value that it has reached when it has received the user's answer. Immediately after this event, the secured microprocessor 100 continues to count.

T3 remains the absolute deadline at which the televiewers can answer the question. Nothing particular happens in the machine at this instant: it receives no information and the secured microprocessor continues to count the time.

At this instant T3, the central computer provided with standard processing means 20, including a central processing unit 21 and memories 22, one of which is loaded with a counting program, itself also begins a time-counting operation.

Since the central computer is central and is used as a reference, this counting is hereinafter called an "absolute" counting. The counting used is supposed to be highly stable and represent the closest possible approximation of real time. T4 is the absolute instant at which the answer to the question is given on the screen for the televiewers. Nothing particular happens at this instant.

The forwarding of specific data elements from each televiewer who has participated in the game takes place later than the instant T5, for example some hours after the game, by the connection of the game machines 40, 40n to the central computer 1. Since many televiewers may have participated, the connections are probably programmed to take place at night.

The televiewers' machines are connected to the central computer by means of a "return channel" whose direction is the reverse of the one used to broadcast the data channel described further above. This return channel may occur directly on the distribution cable if the television is broadcast by two-way cable. The return channel may also be set up on the switched telephone network by simple modem. Other possible return channels may be envisaged. The reference 30 in the diagram of FIG. 4 symbolizes the transmission channel or channels that may be provided for.

When the connection is set up between the central computer 1 and the machine L1, (Ln) of the televiewer by one of the above-mentioned means, the secured microprocessor 100 may then begin a standard authentication procedure to authenticate the central computer and to authenticate itself with the central computer. The authentication mechanisms if any may be based, without distinction, on a cryptography system using a secret key or a known public key without in any way changing the object of the invention.

During the connection, the secured microprocessor 100 sends the central computer the value of the answer given by the televiewer and recorded at the instant T2.

Figure 1:
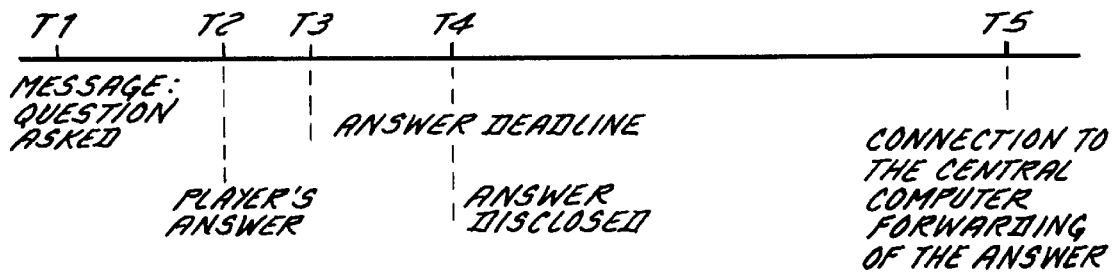
FIG. 1 is a timing diagram of the chronology of the events of the game.
Figure 2:
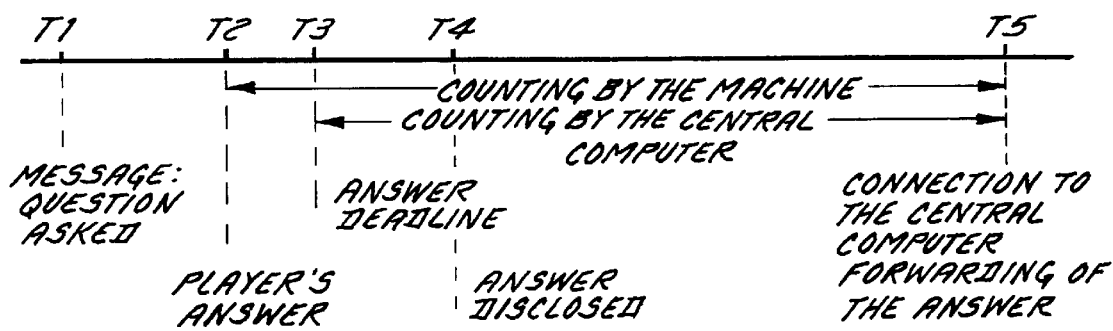
FIG. 2 is a timing diagram such as the one shown in FIG. 1, indicating the counting sequences according to the prior art.
Figure 3:
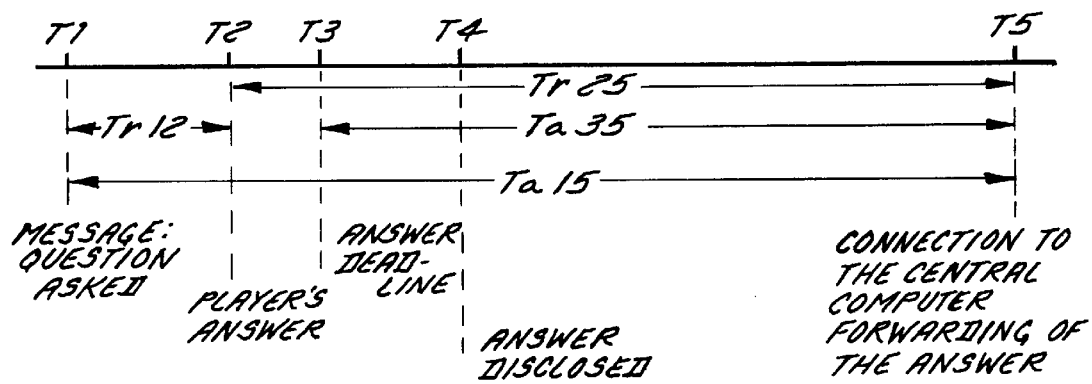
FIG. 3 shows a timing diagram such as the one shown in FIG. 1, indicating the counting sequences according to the invention.

According to the invention, the microprocessor 100 also sends the central computer the values Tr12 and Tr25 wherein:

Tr12 is the relative local time computed in the televiewer's machine by the secured microprocessor between T1 and T2 (as can be seen in FIG. 3), Tr25 is the relative local time computed by this same secured microprocessor between T2 and T5 (as can be seen in FIG. 3).

The televiewer's answer as well as the time values computed locally by the machine 1 may be transmitted with a cryptographic check sum to ensure their integrity and, as the case may be, they may be enciphered for reasons of confidentiality by any known enciphering algorithm. This in no way affects the principle of the invention.

If:

Ta15 denotes the "absolute" time computed by the central computer between T1 and T5 (as shown in FIG. 3);

Ta35 denotes the "absolute" time computed by the central computer between T3 and T5 (as shown in FIG. 3).

According to the invention, the central computer then ascertains that:

Tr25>Ta35 firstly and that

Tr12+Tr25 =Ta15±tolerance values, the tolerance values being predetermined.

If these relationships are verified, then the answer is accepted. Otherwise the central computer rejects it.

Thus, if a fraudulent individual is trying to make it seem as if he has given his answer before T3 whereas he has actually given his answer after T3, he would have to accelerate the clock 150 given to the card between T2 and T5 to obtain an artificial increase in the value of Tr25, but this would be detected because the sum Tr12+Tr25 would no longer be equal to Ta15±tolerance values.

The only fraudulent act which, while being difficult to achieve would all the same be possible, would be that of slowing down the clock signal given to the secured microprocessor between T1 and T2 by a value that is exactly equal to the quantity whose clock signal would have to be subsequently accelerated between T2 and T5 in order that the sum Tr12+Tr25 keeps its legal value. To make this impossible, it would be enough to see to it that the instant T3 is variable with respect to the instant T1 (namely that the time left for the viewer to answer the question is variable from one question to another). Thus, the fraudulent individual cannot predict the value by which the clock signal can be slowed down between T1 and T2 because he does not know the value by which he has to accelerate it subsequently between T2 and T5.

The invention can also be used, by means of a secured microprocessor used in a standard way for smart cards and having no particularly precise reference clock signal or being secured itself, to guarantee the accurate chronology of the events T1, T2, T3 and T5.

Figure 6:
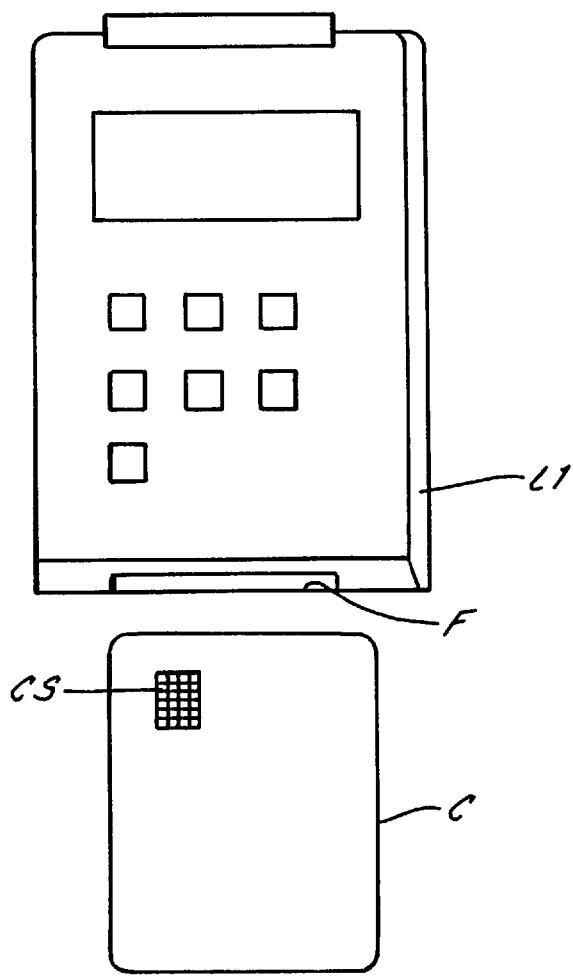
FIG. 6 is a diagram of a machine in a particular embodiment.

FIG. 6 shows a particular embodiment of the invention in which the secured component takes the form of an integrated chip of the memory card C. Thus, the machine has, firstly, the part L1 that can be used for connection to the central computer in order to read the messages displayed on the screen and enter the televiewer's response and a detachable part, namely the memory card with a microprocessor. The part L1 has, for this purpose, a slot F enabling it to receive the card and non-visible connector matching that of the card to enable it to act as a memory card reader.

With this embodiment, the invention can be applied especially well to subscriber television systems that already use smart cards to ensure security against descrambling of the television signals.

TABLE A

| Transmitter/games Central computer | Games machine/ Receiver | Televiewer player |
|---|---|---|
| Games message → | Reception of message Instant T1 Counting of clock pulses; storage of message Reception and storage of answer; Storage of the counting value | ← Answer instant T2 |
| Answer deadline T3 answer → | Reception of answer | |
| Computation Ta15 and Ta35 | ← Setting up of connection with central computer | |
| Reception of answer and Tr12, Tr25 Checking Tr25 > Ta35 Tr12 + Tr25 Ta 15 ± tolerance values | Sending of stored answer Sending of Tr12 and Tr25 | |

What is claimed is:

1. A secured system of remote participation in interactive games, the system comprising a transmission central computer sending out cryptographic messages received by television receivers during a television program, and a games machine available to a televiewer of the television program capable of reading the cryptographic messages and of sending back the televiewer's answer to questions asked in the messages, wherein:

a) the games machine further comprises:

means for counting consecutive periods of time including a period of time Tr12 defined by the instant t1 of reception of the message and the instant t2 of the televiewer's answer, and a period of time Tr25 defined by the instant t2 of the televiewer's answer and the instant t5 of the forwarding of the televiewer's answer to the central computer;

means for transmitting the televiewer's answer and the values Tr12 and Tr25 to the transmission central computer; and wherein b) the central computer further comprises:

means for counting periods of time including a period of time Ta35 defined by the answering deadline t3 and by the answer forwarding instant t5, and a period of time Ta15 defined by the instant t1 of transmission of the message and the answer forwarding instant t5, computation and checking means, the computation and checking means including means for verifying the relationship (1) Tr25>Ta35, and means for verifying the relationship (2) Tr12+Tr25= Ta15±tolerance values, the verifying means (2) defining means for verifying that an oscillation frequency used by the games machine counting means has not been decelerated and subsequently accelerated during the period of time Ta15, and the computation and checking means rejecting the answers when the relationships (1) and (2) are not verified.

2. A secured system of remote participation in interactive games according to claim 1, wherein the counting means of the games machine are formed by a secured microprocessor controlled by a clock implementing a clock pulse counting program.

3. A secured system of remote participation in interactive games according to claim 1, wherein the counting means of the games machine are formed by computation means controlled by an internal clock implementing a clock pulse counting program.

4. A central computer for managing the participation of a televiewer in broadcast scenarios, the televiewer interacting with the central computer via an electronic participation machine, the central computer comprising means for verifying that an oscillation frequency of a time counting means of the electronic participation machine has not been decelerated and subsequently accelerated, a central computer time-counting means, means for broadcasting digital messages to the electronic participation machine, means for establishing a connection with the electronic participation machine, storage processing means wherein:

at an instant T1, when a new broadcast scenario is initialized, the means for broadcasting broadcasts a digital message to the electronic participation machine and initializes and activates the electronic participation machine time-counting means, at an instant T2, when the electronic participation machine receives the televiewer's answer to the question asked, the electronic participation machine time-counting means memorizes the time-counting value T2 and continues counting, at a predetermined instant T3, when the audience is no longer permitted to participate in the scenario, the central computer memorizes the time-counting value T3 and continues counting, at an instant T5, when the machines get connected to the central computer, the central computer memorizes the time-counting values obtained by the electronic participation machine and verifies the following relationships:

Tr25>Ta35 and

Tr12+Tr25=Ta15±tolerance values wherein:

Tr25 is the period of time counted by the electronic participation machine between T2 and T5, Tr12 is the period of time counted by the electronic participation machine between T1 and T2, Ta35 is the period of time counted by the central computer between T3 and T5, Ta15 is the period of time counted by the central computer between T1 and T5, and the relationship Tr12+Tr25=Ta15±tolerance values is verified by the means for verifying.

5. A method of conducting an interactive television program, the method comprising the steps of:

transmitting a question from a central computer to a games machine and receiving the question at the games machine;

receiving an answer to the question at the games machine, the answer being provided by a participant of the interactive television program;

transmitting the answer from the games machine to the central computer and receiving the answer at the central computer;

verifying (1) that the answer was provided to the games machine prior to the expiration of a deadline t3 for answering the question, the verifying step (1) including the step of verifying (2) that an oscillation frequency used by the counter of the games machine was not altered during an interval Ta15 by testing the relationship Tr12+Tr25=Ta15±tolerance values, wherein Tr12 represents the amount of time, as measured by the counter of the games machine, between the instant t1 of reception of the message and the instant t2 of the televiewer's answer as measured by the games machine, Tr25 represents the amount of time, as measured by the counter of the games machine, between the instant t2 of the participant's answer and the instant t5 of the forwarding of the participant's answer to the central computer, and wherein Ta15 represents the amount of time, as measured by the central computer, between the instant t1 of the transmission of the message and the instant t5 of the forwarding of the participant's answer to the central computer;

and, if the above conditions (1) and (2) are not verified, then rejecting the participant's answer.

6. A method according to claim 5, wherein verifying (1) step further includes the step of verifying the relationship Tr25>Ta35, the period of time Ta35 representing the amount of time, as measured by the central computer, between the deadline for answering the question and the instant of the forwarding of the participant's answer to the central computer.

7. A method according to claim 5, further comprising the steps of repeating the transmitting, receiving, and verifying steps a plurality of times; and varying, during each repetition, the amount of time between the instant t1 the question is transmitted and the deadline t3 for answering the question.

8. A method according to claim 5, further comprising the steps of encrypting the question prior to the transmission of the question to the games machine; and decrypting the question after the reception of the question at the games machine.

9. A method according to claim 8, further comprising the step of providing the games machine with a smart card having a microprocessor, and wherein the decrypting step is performed by the microprocessor of the smart card.

10. A method according to claim 5, further comprising the steps of providing a clock pulse to a secured microprocessor of the games machine, the secured microprocessor implementing the counter of the games machine with a clock pulse counting program;

measuring the time periods Tr12 and Tr25 with the secured microprocessor.

11. A method according to claim 5, further comprising the steps of transmitting the values Tr12 and Tr25 to the central computer and receiving the values Tr12 and Tr25 at the central computer.

12. A method according to claim 11, further comprising the steps of enciphering the values Tr12 and Tr25 prior to transmitting the values Tr12 and Tr25 to the central computer; and deciphering the values Tr12 and Tr25 after receiving the values Tr12 and Tr25 at the central computer.

13. A system for participation in a broadcast program and for certification of participation, the system comprising (1) a games machine and (2) a remote central computer, (1) the games machine further comprising:

a clock signal generation circuit;

means for receiving digital information elements coming from the central computer at an instant T1;

a secured electronic component comprising a secured microprocessor and a memory, the secured microprocessor being coupled to the clock signal generation circuit, to the receiving means and to the memory, the secured microprocessor receiving the information elements from tie receiving means and recording the information elements in the memory, the secured microprocessor counting time units proportional to the period of a clock signal from the clock signal generation circuit and thereby forming a games machine time counter, said games machine time counter measuring an interval Tr12 which is the time between the instants T1 and T2 and an interval Tr25 which is the time between instants T2 and T5;

a user interface, the interface receiving at the instant T2 an answer from the participant, and the interface transmitting the participant's answer to the secured microprocessor;

means for establishing a connection with the central computer at the instant T5, the means for establishing permitting transmission of the participant's answer and counting information from the secured microprocessor to the central computer; and (2) the central computer farther comprising:

a central computer time counter, said central computer time counter measuring an interval Ta15 which is the time between the instant T1 and T5;

means for verifying that the oscillation frequency of the clock signal generation circuit was not altered between the instants T1 and T5, said verifying means verifying the relationship Tr12+Tr25= Ta15±tolerance values;

and wherein the central computer rejects the answer if the oscillation frequency was altered.

14. A system according to claim 13, wherein the games machine comprises a chip card reading means and a chip card, the card comprising the secured component in the form of an integrated chip card including a microprocessor and working and program memories.

* * * * *